Oct. 31, 1933.                     J. P. BEM                      1,932,541
                          FRUIT BISECTING MACHINE
                            Filed Nov. 1, 1930
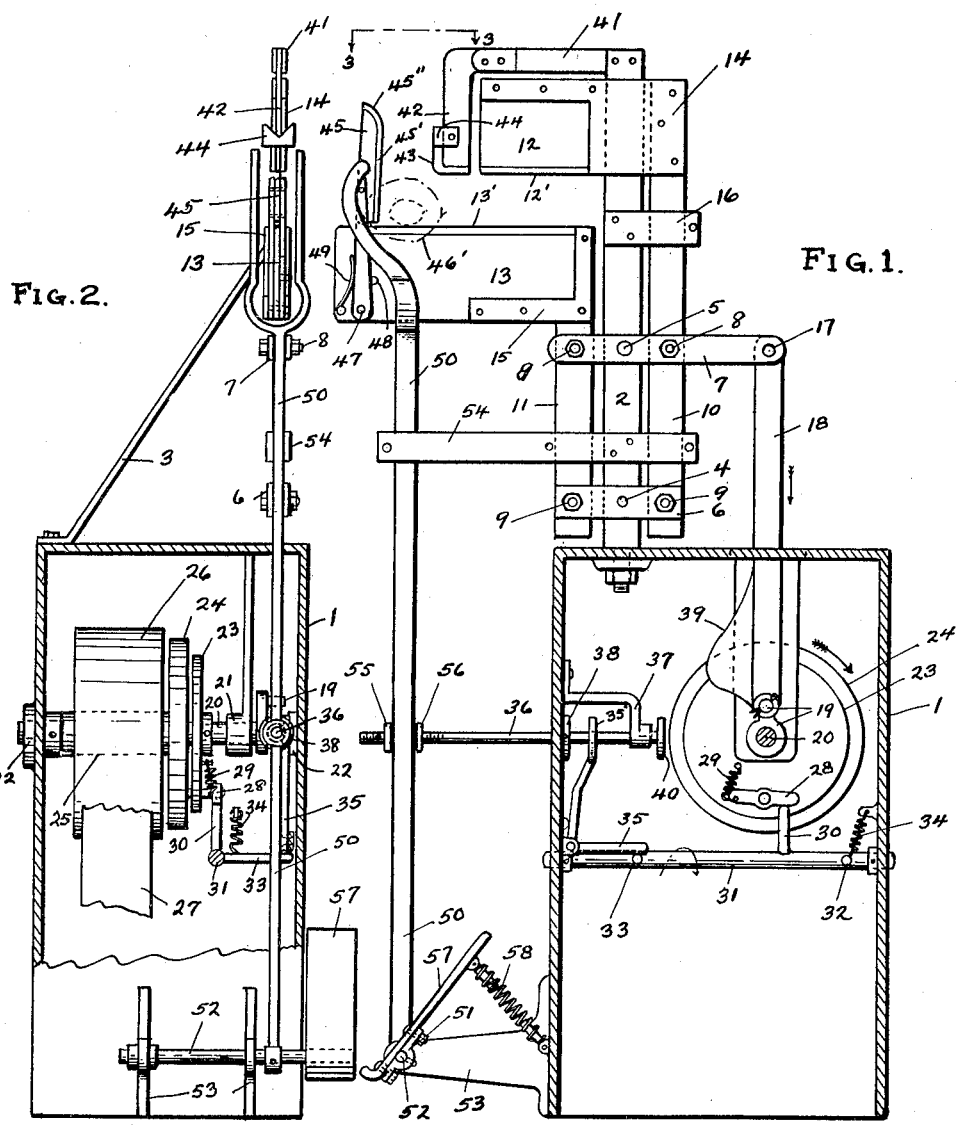
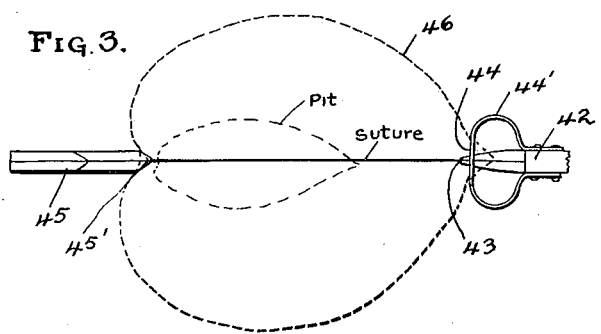
INVENTOR.
JOSEPH P. BEM
BY *Miller Boyken & Fried*
ATTORNEYS.

Patented Oct. 31, 1933

1,932,541

UNITED STATES PATENT OFFICE 1,932,541

FRUIT BISECTING MACHINE

Joseph P. Bem, Oakland, Calif., assignor to Pacific Pitting Machine Company Inc., Fresno, Calif., a corporation of California Application November 1, 1930. Serial No. 492,773

7 Claims. (Cl. 146—72)

This invention relates to machines or apparatus for bisecting fruits, particularly drupaceous fruits, preparatory to removing the pits or cores from the same.

The objects of the invention are to provide simple, durable, quick-acting mechanism which will bisect all kinds of fruits, especially peaches, and which will make a clean cut through both fruit and pit, yet overcome the objection of circular and band saws formerly used for the purpose.

Other objects of the invention will appear in the following description and accompanying drawing.

In the drawing Fig. 1 is a side elevation of my machine, Fig. 2 is a front elevation, and Fig. 3 is an enlarged plan view of a portion of the machine as seen from the line 3—3 of Fig. 1. Figs. 1 and 2 show base housing broken away.

Before describing the machine in detail, it would be well to say that after several years in experimenting and building machines for bisecting drupaceous friuts I have employed high speed circular saws, band and jig saws, but found that the saws speedily got dull in cutting through thousands of hard fruit pits, such as peach pits, and that there was also the danger from breakage and bodily injury from these saws, and in working to overcome these objects I have found that the fruit and pit within it may be perfectly bisected by means of a special pair of chopping blades which descend in alignment through the fruit and pit and stop when almost touching one another edge to edge. I have also found the action of the blades to be better if they are given a slight shearing action, also that a machine built on this principle will run many times as long as a saw without the cutting edges becoming dull.

In an actual machine constructed on the chopping principle, means are provided for quickly presenting the fruit, such as peaches, so that the suture will be aligned with the plane of the blades, and means for placing the fruit into position for chopping and automatically engaging the power clutch so that the fingers of the operative will not be in danger.

Other features of importance will appear in the detailed description.

In the drawing the machine comprises a main box-like base 1 housing the power drive to be later described, and upon which base is firmly mounted a vertical flat steel bar or post 2 braced as at 3, and against the opposite sides of which post are pivoted at 4 and 5 two sets of double rocker bars or flat links 6 and 7 in turn pivoted at 8 and 9 to two vertical bars 10 and 11 similar to bar 2 all so that bars 10 and 11 may be vertically reciprocated upon rocking on their rocker bar support, while each of the vertical bars 10, 11 carries at its upper end one of the chopping blades 12, 13, secured to their respective bars by plates 14, 15, screwed or otherwise secured to opposite sides of the blades.

The blades are flat plates of high grade steel arranged in one vertical plane and with their confronting cutting edges 12', 13' extending horizontally. The lower blade 13 is about twice as long as the upper blade, and the securing plates 14 of the upper blade straddle fixed bar 2 so as to form a sliding guide for the blade, while an intermediate guide is provided for the longer bar 10 comprising a pair of short plates 16 secured to bar 2 properly spaced to form a snug bearing for the movable member.

Through means of the structure described the blades are movable toward and away from one another upon rocking bar 7, yet are held firmly in one plane of operation. To operate the blades rocker bar 7 is extended in the form of a lever and pivotally connected at its end at 17 with a vertical link or connecting rod 18 in turn pivoted at its lower end to a crank 19 on a horizontally extending shaft 20 mounted in bearings 21, 22 in housing 1 and which shaft carries one, 23, of a pair of clutch elements, the other member 24 being carried on a sleeve 25 loose on shaft 20 and secured to a pulley 26 supplied by power from a belt 27. The clutch formed by members 23 and 24 is of conventional design controlled by a trip 28 carried on the face of member 23 which is actuated by a spring 29 to engage the clutch elements, but is adapted upon each revolution of the clutch to strike a releasing arm 30 carried on a revolable or rock shaft 31 supported in the housing or frame 1.

Rock shaft 31 is provided with two pins 32, 33 projecting from its side the first of which is connected by a tension spring 34 with the frame so as to normally hold the releasing arm 30 under the clutch trip 28 as shown in the drawing, while the other pin 33 has bearing against it one end of a bell crank 35 the other end of which is yoked at 35' over a small push rod 36 slidably mounted in the frame 1 and a bracket 37. Push rod 36 carries a collar 38 adapted to engage yoke 35' upon inward sliding of the rod and thereby swing lever 35 and thereby rock shaft 31 to move releasing arm 30 out from under clutch trip 28 so that its spring 29 will operate it to thereby at once engage the ever rotating clutch element 24 and thereby rotate element 23, and which it would then continue to do unless means were provided to automatically stop it at each revolution.

Such means is provided in a cam 39 carried on connecting rod 18 and which in revolution of the clutch element 23 in direction of the arrow contacts a disk 40 secured to the inner end of slidable rod 36 and pushes it back to starting position so that shaft 31 is free under influence of spring 34 to turn and swing the releasing arm 30 in the path of clutch trip 28 and thus instantly break the clutched engagement of members 23, 24 so that member 23 will stop in position shown in Fig. 1 with connecting rod 18 vertical, rocker bars 6 and 7 horizontal, and chopping blades 12 and 13 open.

On account of the blade carrying bars 10 and 11 being pivoted to spaced rocking bars, when the blades approach one another, there is also a shearing action of about a half inch as blade 13 swings to the right in its upward movement and blade 12 swings to the left in its downward movement. The amount of this shearing movement depends of course on the position of the pivotal points of the blade mounting.

The blades are of flat steel about a sixteenth of an inch in thickness and they are rendered perfectly stiff by the L-shaped reinforcing frame plates 14, 15, secured to opposite sides of them.

The fixed bar or supporting post 2 carries a bracket 41 which extends over the top of blade 12 and then vertically down in front of the forward edge of the blade in the form of a flat plate 42 which is forwardly widened and sharpened as at 43, and also sharpened at its lower edge in alignment with the elevated cutting edge of blade 12, while just above point 43 is a special V-shaped tip cutting blade 44 which is outwardly bowed as at 44', (Fig. 3) and secured at its ends to the sides of plate 42.

In plan, the forward portion 44 of the tip cutting blade lies just back of the vertical edge of blade or aligning plate 43 as clearly shown in Fig. 3. In this figure it will also be seen that another vertical guide or aligning plate 45 is provided forwardly of aligning blade 43 so that when a peach is placed in position as dotted at 46 and pushed straight downward the point or tip of the peach will be cut off by the tip cutting knife 44 to pass out between the bowed sides of this knife while the peach itself becomes impaled on the confronting edges of plates 43, 45 and which are not sharp enough to cut the operative's fingers but are only sharpened sufficiently to form a guiding groove in the fruit so that it will pass straight down to lower chopping blade 13.

Forward guide plate 45 stands about vertically, is pivoted at its lower end at 47 to lower chopping blade 13 and resiliently forced toward guide plate 43 to the limit as prescribed by a stop pin 48 by means of a spring 49 on one or both sides of blade 13 and the upper end of guide plate is rounded as at 45'' so as to receive any size peach or other fruit, the plate moving away from plate 43 to accommodate the size of the fruit but the springs 49 being sufficiently strong to make the guiding edges 43, 45' of plates 42 and 45 penetrate into the flesh of the fruit sufficiently to form the guiding grooves.

When using the machine on peaches, each peach is turned to bring its suture uppermost, the tip is hooked into the tip cutting knife which is formed with a V cutting notch (see Fig. 2) to receive the tip, and with a downward shove the peach is at once tipped and forced into impaled engagement with lower chopping blade 13 as indicated at 46' in Fig. 1.

When the fruit is in the position on the lower blade as shown in Fig. 1 it is then slid along plate 13 to bisecting position between blades 12 and 13 by means of the two curved or hooked upper ends of a long forked lever 50 which extends downward to a point adjacent the floor where it is pivoted as by securing to a horizontal shaft 52 rotatably supported in brackets 53. Lever 50 is guided in oscillatory motion by means of a pair of spaced bars 54 extending horizontally from support post 2 and which bars also function as another pair of intermediate guides for blade carrying rods 10 and 11.

Lever 50 is limited in its outward or leftward movement by a nut 55 on push rod 36, and upon inward or rightward movement it bears against a nut 56 on push rod 36 so as to move the latter inward to trip the chopper operating clutch as already described.

Lever 50 is rocked by the operative through means of a foot pedal 57 secured to shaft 52 and normally urged outward by a compression spring 58 so as to hold lever 50 to the left as far as it will go.

With the machine as described an operative takes one peach after the other and places between aligning plates 43, 45 with suture in a vertical plane and with tip in tip cutting socket and bloom end in contact with edge of plate 45, then pushes peach down to blade 13, presses on pedal to thereby first swing forked lever 50 to the right and carry peach along blade 13 and under blade 12, then automatically tripping clutch to operate the cutting blades once to instantly sever both peach and pit, the cam 39 on connecting rod at once kicking lever 50 back for the next peach and clutch tripping out with blades open to receive next peach.

In operation the pivoted blade actuating mechanism gives an almost instantaneous chopping movement of the blades and this quick action combined with the shearing movement which produces a clean smooth cut through both peach and pit without tendency to swerve from the path of cleavage or tear the fruit when encountering the uneven and hard surfaces as presented by the pit of a peach. The blades are sharpened centrally from both sides and do not quite meet in closing.

In practice suitable chutes are arranged at opposite sides of the machine to carry away the bisected fruit but this has been omitted from the drawing as it would tend to confuse the same and does not involve invention.

While I have described the machine as in cutting peaches, it operates equally well on apricots, pears, or any kind of fruit which it is desired to bisect.

In reference to the drive belt 27 shown in the housing, it is apparent that this is symbolical only as any desired form of drive may be used to keep the live clutch member 24 in motion.

I claim:—

1. In a fruit bisecting machine, a pair of flat chopping blades with edges in confronting relation, a bar for each blade and to which the blade is mounted and projects therefrom, a lever pivoted to a fixed support intermediate the bars and to the bars, in a manner to cause relative motion of the blades toward and from one another when the lever is rocked, power means for rocking the levers, and means automatically disengaging the power means at each open position of the blades.

2. In a fruit bisecting machine, a pair of chopping blades arranged with cutting edges in confronting relation, means mounting the blades for relative chopping motion toward and from one another for bisecting a fruit placed therebetween, and means for positioning a fruit between the chopping blades comprising auxiliary blades in the plane of said chopping blades and between which auxiliary blades the fruit is impaled for delivery in alignment to said chopping blades.

3. In a fruit bisecting machine, a pair of chopping blades arranged with cutting edges in confronting relation, means mounting the blades for relative motion toward and from one another for bisecting a fruit placed therebetween, one of said blades projecting forwardly beyond the other blade and arranged to receive the fruit for sliding therealong to a position between the blades.

4. In a fruit bisecting machine, a pair of chopping blades arranged with cutting edges in confronting relation, means mounting the blades for relative motion toward and from one another for bisecting a friut placed therebetween, one of said blades projecting forwardly beyond the other blade to receive the fruit for sliding therealong to a position between the blades, and means for so sliding the fruit.

5. In a fruit bisecting machine, a pair of chopping blades arranged with cutting edges in confronting relation, means mounting the blades for relative motion toward and from one another for bisecting a fruit placed therebetween, one of said blades projecting forwardly beyond the other blade to receive the fruit for sliding therealong to a position between the blades, and manually operated means for so sliding the fruit.

6. In a fruit bisecting machine, a pair of flat chopping blades arranged in one plane with cutting edges in confronting relation, means mounting the blades for relative motion toward and from one another for bisecting a fruit placed therebetween, a pair of spaced flat plates in the plane of said blades adapted for impaling and aligning the fruit preparatory to cutting the same forming guides extending substantially at right angles to the cutting edges of said blades and leading to the blades.

7. In a fruit bisecting machine, a pair of flat chopping blades with edges in confronting relation, a supporting bar for each blade and to which the blade is mounted with its cutting edge extending at right angles therefrom, a fixed support between the bars, a lever extending transversely of the bars pivoted to said fixed support and to the bars in a manner to cause relative motion of the blades toward and from one another when the lever is rocked.

JOSEPH P. BEM.